United States Patent
Adelmann et al.

(10) Patent No.: US 10,696,144 B2
(45) Date of Patent: Jun. 30, 2020

(54) SUN BLIND SYSTEM FOR A SUNROOF OF A MOTOR VEHICLE, MORE PARTICULARLY FOR A SLIDING ROOF SYSTEM

(71) Applicant: Roof Systems Germany GmbH, Dietzenbach (DE)

(72) Inventors: Franz Adelmann, Dietzenbach (DE); Dirk Eis, Dietzenbach (DE)

(73) Assignee: ROOF SYSTEMS GERMANY GMBH (DE)

(*) Notice: Subject to any disclaimer, the term of this patent is extended or adjusted under 35 U.S.C. 154(b) by 0 days.

(21) Appl. No.: 16/209,274

(22) Filed: Dec. 4, 2018

(65) Prior Publication Data
US 2019/0176596 A1   Jun. 13, 2019

(30) Foreign Application Priority Data
Dec. 8, 2017 (DE) .................. 10 2017 129 328

(51) Int. Cl.
  *B60J 3/02*       (2006.01)
  *B60J 7/00*       (2006.01)
  *B60J 1/20*       (2006.01)
  *B60J 7/06*       (2006.01)
  *B60J 7/043*      (2006.01)

(52) U.S. Cl.
  CPC .......... *B60J 7/0007* (2013.01); *B60J 1/2052* (2013.01); *B60J 1/2061* (2013.01); *B60J 7/0015* (2013.01); *B60J 7/0023* (2013.01); *B60J 7/061* (2013.01); *B60J 7/043* (2013.01)

(58) Field of Classification Search
  CPC .............................. B60J 7/0007; B60J 7/0015
  USPC .................................... 296/214, 219; 160/85
  See application file for complete search history.

(56) References Cited

U.S. PATENT DOCUMENTS

| | | | | |
|---|---|---|---|---|
| 7,114,767 B2* | 10/2006 | Grimm | ................. | B60J 7/0015 296/214 |
| 7,793,702 B2* | 9/2010 | Biewer | ................. | B60J 7/0007 160/272 |
| 9,067,479 B2* | 6/2015 | Yukisada | ............... | B60J 7/0015 |

FOREIGN PATENT DOCUMENTS

| | | |
|---|---|---|
| DE | 3427772 A1 | 2/1986 |
| DE | 9301142 U1 | 3/1993 |
| DE | 102009040766 A1 | 3/2011 |
| WO | 2010022768 A1 | 3/2010 |

* cited by examiner

Primary Examiner — Dennis H Pedder
(74) Attorney, Agent, or Firm — Dilworth IP, LLC (57) ABSTRACT

The invention relates to a sun blind system for a motor vehicle, having two guide rails, in each of which a guide band is received, and a flat blind body which is connected to the two guide bands, wherein a receiving channel is provided on each guide rail for the corresponding guide band, said channel having two guide sections which are connected together by a deflecting section.

16 Claims, 7 Drawing Sheets

SUN BLIND SYSTEM FOR A SUNROOF OF A MOTOR VEHICLE, MORE PARTICULARLY FOR A SLIDING ROOF SYSTEM

CROSS REFERENCE TO RELATED APPLICATIONS

This application claims priority under 35 U.S.C. § 119 to the following German Patent Application No. DE 10 2017 129 328.0, filed on Dec. 8, 2017, the entire contents of which are incorporated herein by reference thereto.

BACKGROUND

The invention relates to a sun blind system for a sunroof of a motor vehicle, having two guide rails in each of which a guide band is received, and a flat blind body which is connected to the two guide bands.

The sunroof of the motor vehicle can be a fixed window or a cover of a sliding roof system. The sun blind is used as required to prevent the sun's radiation from being incident directly in the interior of the vehicle. Beyond the primary function of providing shade, the sun blind can also be used to shield against the headwind when the cover of the extended sliding roof system is open.

The sun blind consists of the guide bands and the blind body. Furthermore, especially in the case of manually actuated sun blinds, a hoop is provided, i.e. a reinforcement at the front end of the blind body which extends transversely across the blind body, in most cases is connected to the guide bands and can be gripped by an occupant of the vehicle in order to move the sun blind forwards or backwards.

The guide bands are guided in the guide rails such that the blind body can be moved between a retracted position in which it is located outside the roof opening or the sunroof, and a more or less extended (or advanced) position. In the extended position, the roof opening or the sunroof is more or less covered. The guide rails are typically located laterally beneath the sunroof or roof opening.

In all sun blinds there is the problem that most of the guide bands and of the blind body have to be stowed in the location where the sun blind is located when retracted.

One possibility resides in winding up the sun blind. In this case, only a small amount of space is required in the longitudinal direction of the vehicle. However, a relatively large amount of space is required along the vertical axis of the vehicle.

BRIEF SUMMARY

The object of the invention consists of providing a sun blind system in which the sun blind requires as little space as possible when retracted.

In order to achieve this object, in a sun blind system of the type mentioned in the introduction provision is made in accordance with the invention that a receiving channel is provided on each guide rail for the corresponding guide band, said channel having two guide sections which are connected together by a deflecting section. The core principle of the invention resides in stowing the sun blind "in two layers", namely in the two guide sections which are connected together by the deflecting section. The deflecting section can be designed with such a radius that it receives a considerable part of the sun blind. The installation space required by the receiving channel, viewed along the extension direction of the guide rails, is thus shorter than half the sliding path of the sun blind between the completely retracted position and the completely extended position. At the same time, a compact design is achieved when viewed along the vertical axis of the vehicle.

In accordance with one embodiment of the invention, provision is made that the receiving channel consists of synthetic material. This allows it to be produced as an injection-moulded part at little cost.

The receiving channel can be formed in the region of the guide sections at least substantially with an undercut, beneath which the guide band is received and so the guide band is reliably held in the receiving channel and cannot leave this channel.

In accordance with a preferred embodiment of the invention, provision is made that a deflecting roller is arranged in the region of the deflecting section of each receiving channel. In this way, the friction in the region of the deflecting section can be considerably reduced, in particular when the deflecting roller is rotatably mounted with low friction.

The deflecting roller has a radius which is a compromise between, on the one hand, a small amount of bending of the guide bands and at the same time a long received length of the guide bands, and, on the other hand, a small construction height, so that sufficient head room is provided for the occupants of the vehicle. A radius of at least 15 mm has proved to be a suitable lower limit for the dimensions of the deflecting roller.

Preferably, the deflecting roller has, on its side facing the opposite receiving channel, a collar with no undercut, so that the guide band can enter the region of the deflecting roller and can subsequently leave same unhindered.

In accordance with one embodiment of the invention, provision is made that the outer diameter of the deflecting roller is slightly larger in the region in which it is contacted by the guide band than the outer diameter of the regions of the deflecting section adjoining the deflecting roller axially on the outside. It is hereby ensured that the guide band, when supported on the inner part of the deflecting section, contacts the deflecting roller and not the fixed part of the deflecting section.

Preferably, an outer cover flange is provided in the region of the deflecting section, so that the guide band is prevented from leaving the deflecting section towards the outside.

BRIEF DESCRIPTION OF THE FIGURES

The invention will be described hereinafter with reference to different embodiments which are illustrated in the attached drawings. In the drawings, FIG. 1 schematically illustrates a motor vehicle having a sun blind system arranged in the roof.

DETAILED DESCRIPTION

Figure 1:
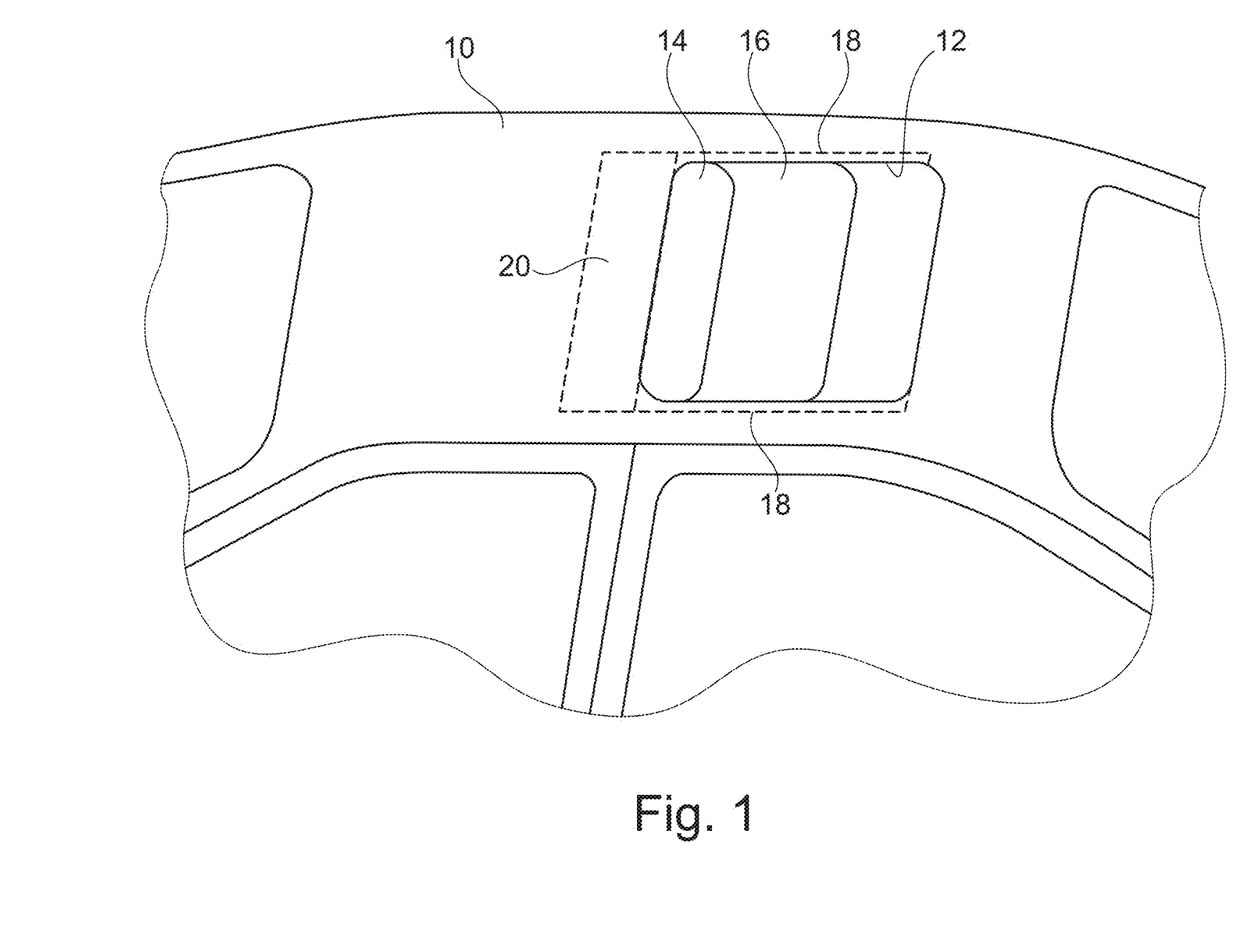

FIG. 1 schematically illustrates a vehicle roof 10 with a roof opening 12 in which a cover of a sliding roof system is slidably arranged. Arranged beneath the cover 14 is a sun blind 16 which can be slid forwards and backwards in two schematically illustrated guide rails 18 which extend along the longitudinal direction of the vehicle.

The components of the sliding roof system, with which the cover 14 can be moved, are known per se and are thus not illustrated here.

As an alternative to a sliding roof system, provision can also be made that the roof opening 12 is closed by a fixed window element beneath which the sun blind 16 is arranged.

When completely extended, the sun blind 16 substantially covers the roof opening 12. In order to uncover the roof opening 12, it can be slid backwards so that it is located in a schematically indicated receiving space 20.

The sun blind 16 consists of a blind body 22 which is rectangular in shape and of two guide bands 24 which extend along two mutually parallel side edges of the blind body 22. The two guide bands 24 are received in the guide rails 18 such that the sun blind 16 can be slid therein.

The blind body 22 consists of a flexible material. It can be a woven material, a film, a knitted fabric or another material by means of which the desired shielding of the vehicle interior against the sun's radiation and also the headwind can be achieved. In a particularly preferred manner, polyester can be used.

The two guide bands 24 can be flat, narrow strips of synthetic material. The width is in the order of magnitude of 6 mm to 10 mm and the height is in the order of magnitude of 250 μm to 500 μm.

As the material for the guide bands 24, a polyester is used, in particular polyethylene terephthalate (PET), polybutylene terephthalate (PBT) or polycarbonate (PC).

Figure 2:
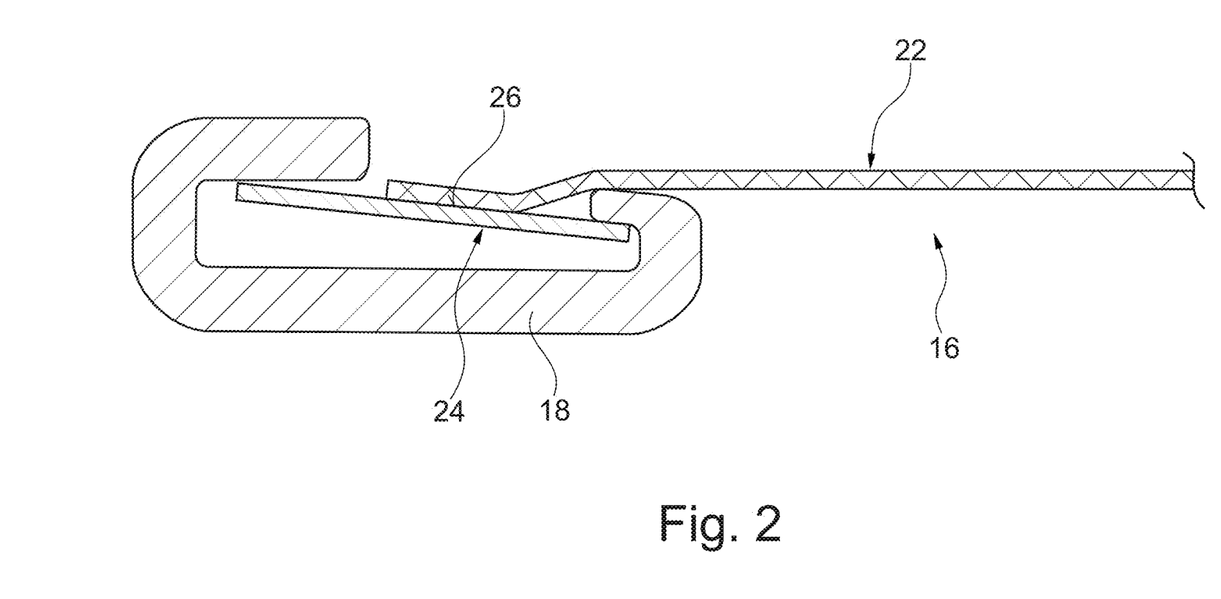
FIG. 2 schematically illustrates a section through one of the guide rails of the sun blind system of FIG. 1 having a sun blind in accordance with a first embodiment.
Figure 3:
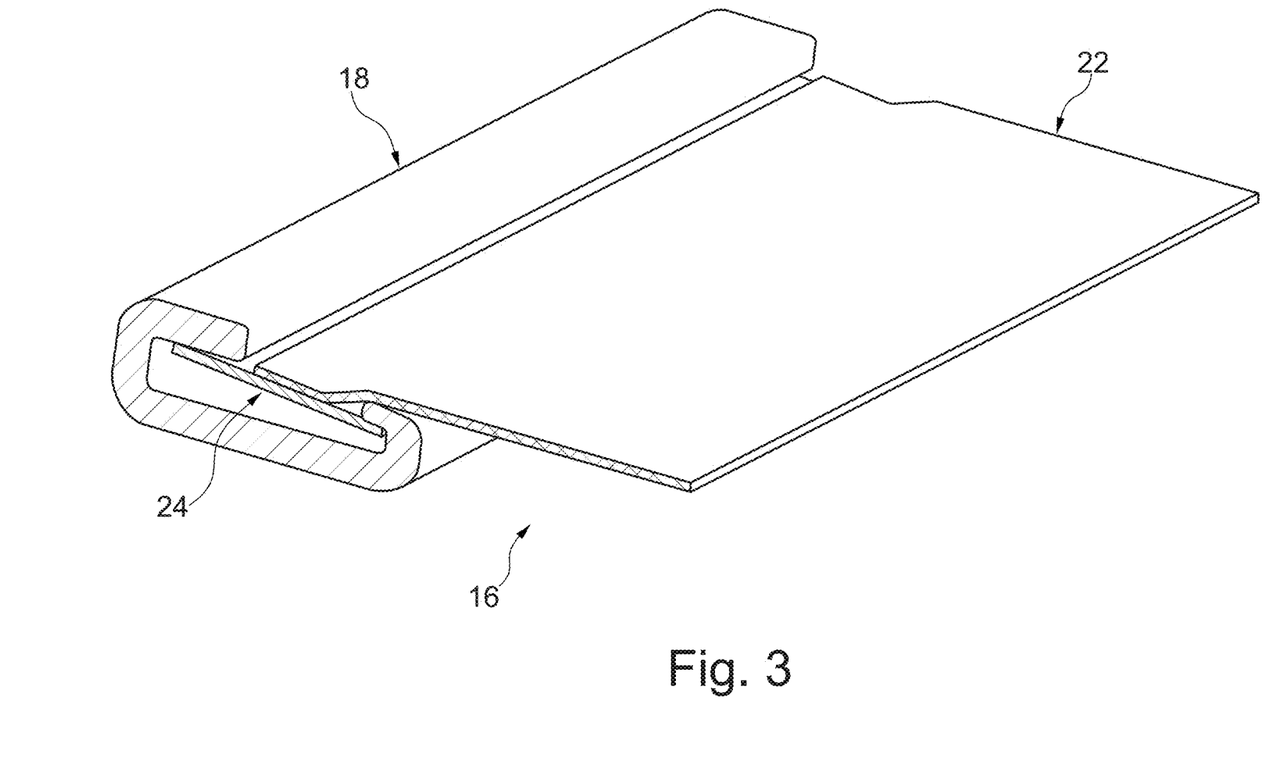
FIG. 3 illustrates a schematic perspective view of the sun blind of FIG. 2.

In the embodiment illustrated in FIGS. 2 and 3, the blind body 22 is connected to the guide bands 24 on one side approximately in the middle. The blind body 22 is welded to the guide bands 24 (see the weld seam 26).

The width of the weld seam is in this case in the order of magnitude of 25 to 30 percent of the width of the corresponding guide band 24.

The guide rails 18 have a cross-section in the shape of a very flat C, wherein the blind body 22 exits the inner cross-section of the guide rails 18 in the region between the two short limbs. Since in this case the blind body 22 is connected to the guide bands 24 approximately in the middle, the guide bands 24 are supported on the inside of the cross-section of the guide rails 18 without the blind body 22 coming into contact with the inner surfaces of the guide rails 18.

FIG. 2 shows that the short limb of the C-shaped cross-section arranged towards the middle of the vehicle (i.e. the limb on the right-hand side) is arranged at a lower level than the limb located on the outside of the vehicle. Therefore, the guide band 24 is slightly inclined in the guide rail 18 and so the weld seam is slightly "raised". The blind body 22 thus extends slightly over the inner limb of the guide rail 18.

Figure 4:
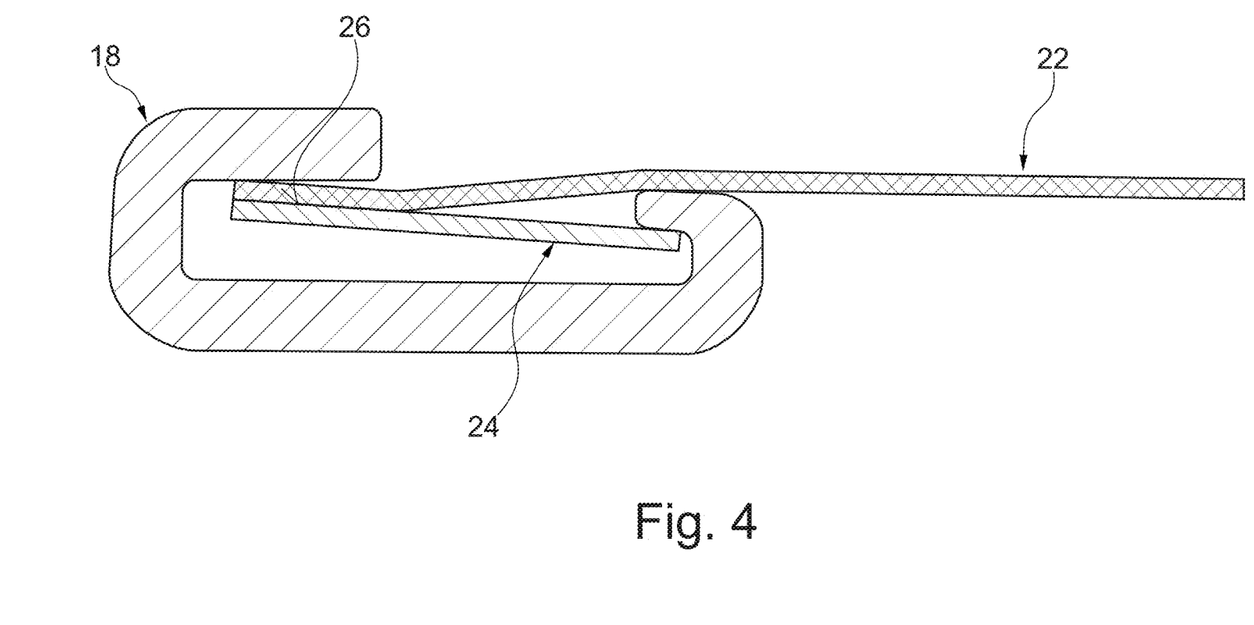
FIG. 4 schematically illustrates a view, corresponding to that of FIG. 2, of a sun blind in accordance with a second embodiment.
Figure 5:
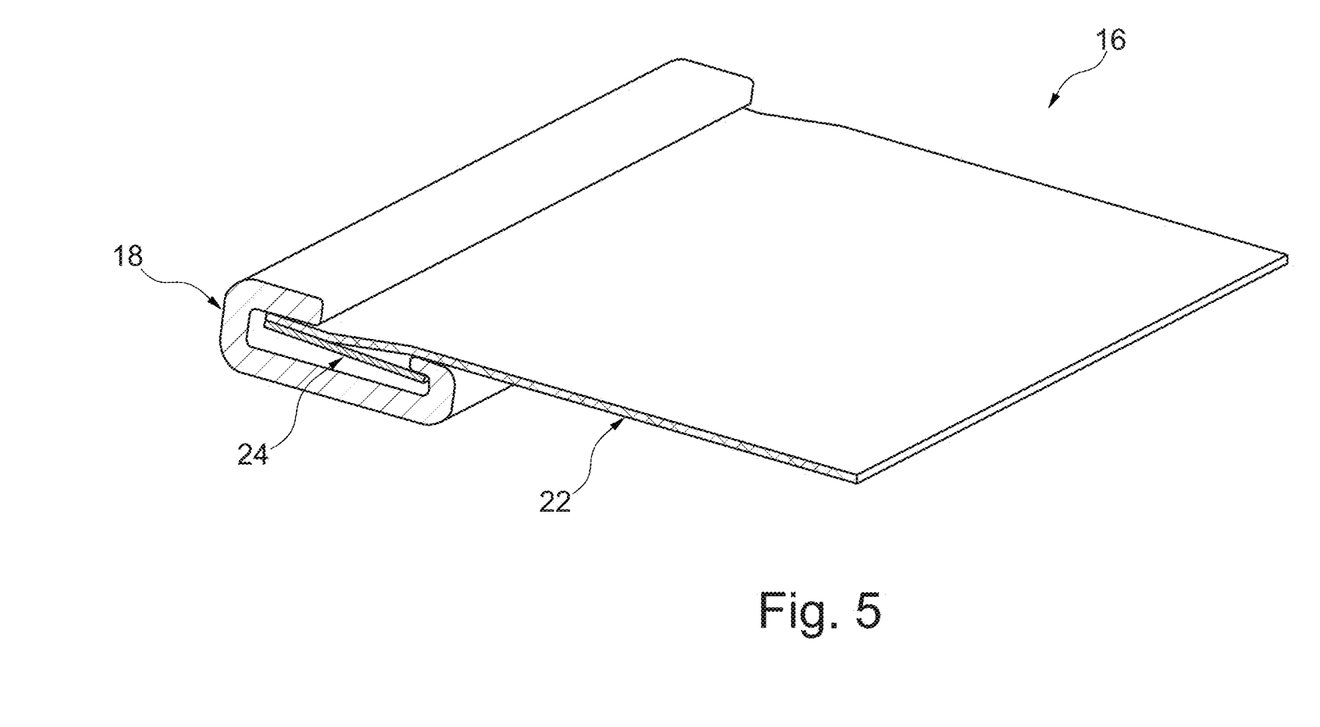
FIG. 5 illustrates a schematic perspective view of the sun blind of FIG. 4.

FIGS. 4 and 5 illustrate a second embodiment. For the components known from the previous embodiment, the same reference signs are used and reference is made in this respect to the explanations given above.

The difference between the first and the second embodiment is that in the second embodiment the blind body 22 is welded to the side of the guide bands 24 facing away from the middle of the vehicle. Therefore, the blind body 22 lies against the outer limb on the inside of the guide rail 18. In a similar manner to the first embodiment, the two inner surfaces of the short limbs are also located in this case at different levels, and so the guide band 24 is inclined such that the friction between the blind body 22 and the inner limb of the guide rail 18 is reduced.

In all of the embodiments, the guide rails 18 are made from metal, in particular aluminium. The sun blind 16 contacts the guide rails 18 directly, i.e. the guide rails 18 do not have an interconnected sliding element on the inside at least in the region of contact with the sun blind 16. A corrosion-protection coating is possibly provided. Therefore, the installation space can also be reduced.

As an alternative to guide bands made from synthetic material, guide bands made from metal, e.g. spring steel, are also feasible, to which the blind body is adhered.

Figure 6:
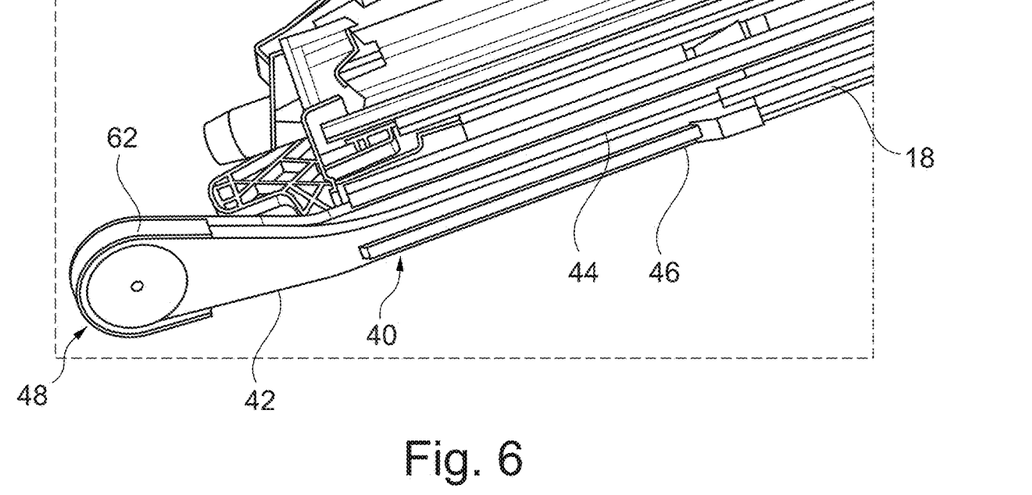
FIG. 6 illustrates a perspective view of a part of a guide rail with a receiving channel attached thereto for one of the guide bands.
Figure 7:
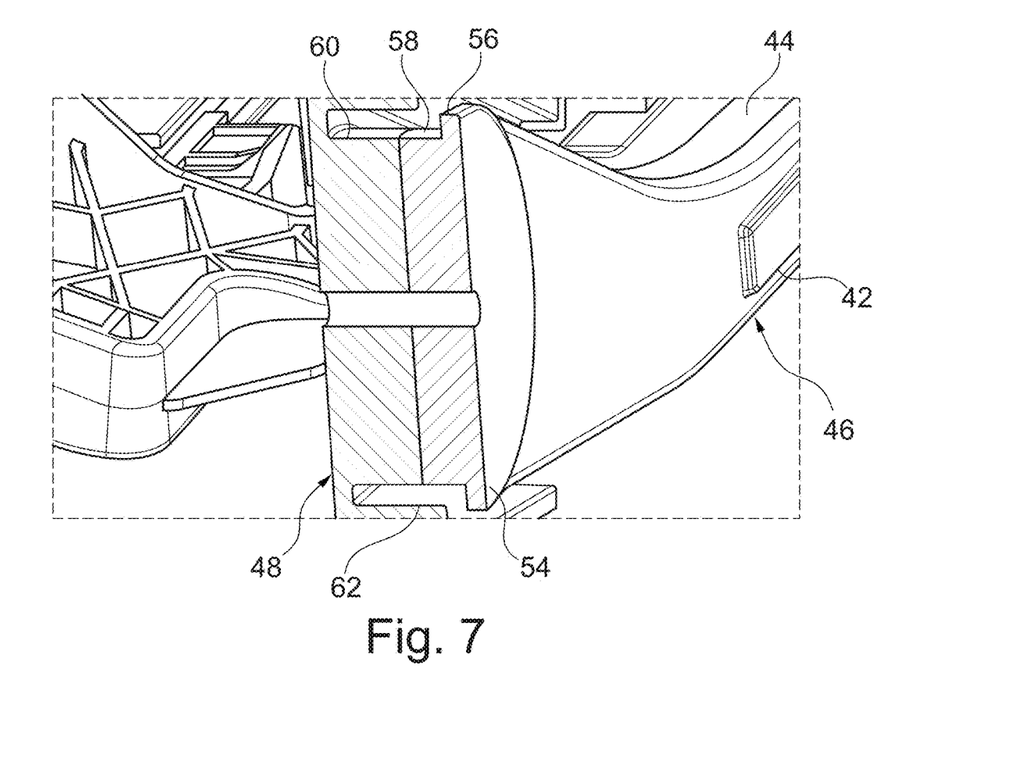
FIG. 7 illustrates a sectional view along plane VII-VII of FIG. 6.

FIG. 6 illustrates one of the guide rails 18. Adjoining this is a receiving channel 40 which is used to receive the guide band 24, which can slide in the corresponding guide rail 18 when the sun blind is partly or completely retracted.

The receiving channel 40 extends in this case along the outer side of an elongate synthetic material part 42 and is formed by an upper guide section 44 and a lower guide section 46 which are connected together by a deflecting section 48. The two guide sections 44, 46 extend in the broadest sense in parallel with each other whilst the deflecting section extends by approximately 180°. Accordingly, the guide band 24 extends, when the sun blind 16 is completely retracted, along the upper guide section 44 and then around the deflecting section 48 and then forwards along the lower guide section 46.

Figure 8:
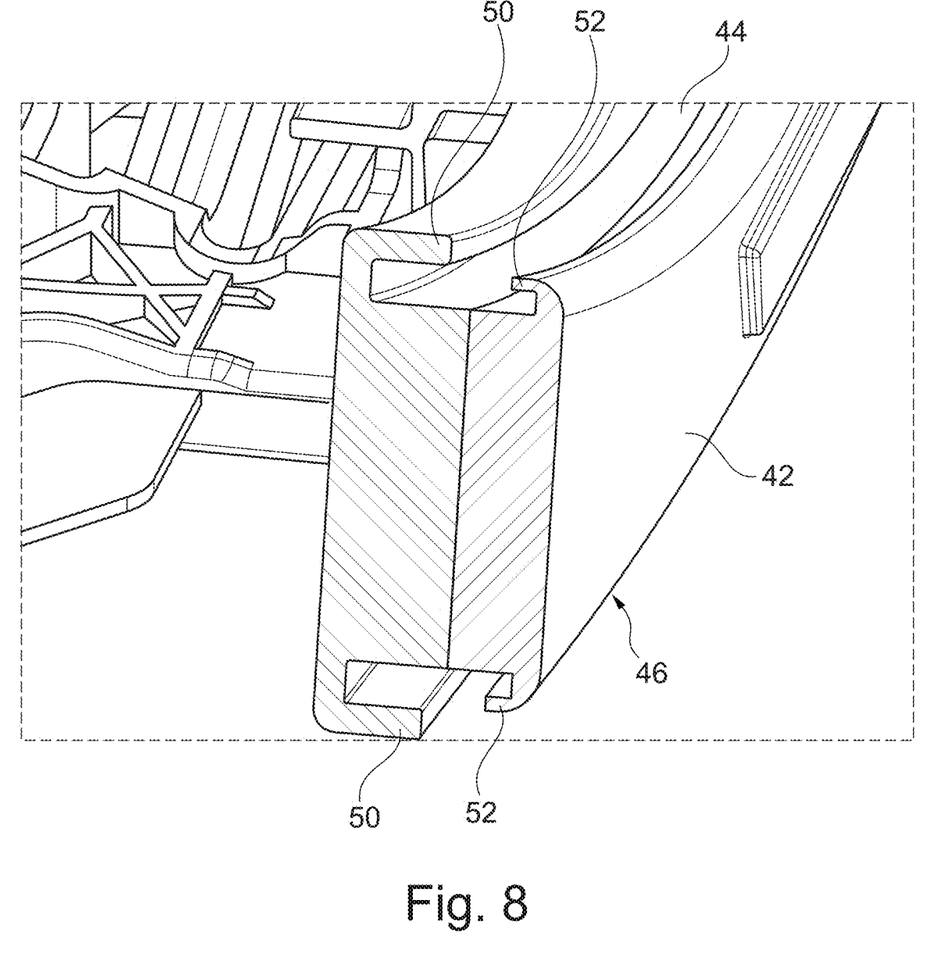
FIG. 8 illustrates a sectional view along plane VIII-VIII of FIG. 6.

As can be seen in FIG. 8, the inner contour of the guide sections 44, 46 corresponds substantially to the inner contour of the guide rails 18. Accordingly, two undercut edge sections 50, 52 are provided, beneath which the corresponding guide band 24 is received, whilst the blind body extends out through the free space between the two edge sections.

A deflecting roller 54 is arranged in the region of the deflecting section 48 and is rotatably mounted on the synthetic material part 42 via a bearing, not indicated.

The bearing can be a bearing pin. It is also feasible to use a roller bearing.

The deflecting roller 54 has, on its side facing the opposite receiving channel, a collar 56 which protrudes beyond the peripheral surface 58 of the deflecting roller 54. The collar 56 does not have an undercut.

The outer diameter of the peripheral surface 58 of the deflecting roller 54 is slightly larger than the outer periphery of the adjacent guide surface 60 of the synthetic material part 42 and so the guide band 24 lies against the deflecting roller 54 when it is supported on the inside in the region of the deflecting section 48.

An outer cover flange 62 is provided in the region of the deflecting section 48 and guides the guide band 24 in the region of the deflecting section 48.

The blind body 16 is not guided in the region between the mutually opposite receiving channels 40. It is held taut by the guide bands 24 which are guided in the guide sections and the deflecting section. In particular, a winding shaft is in no way required. The vehicle interior-side ceiling can be arranged directly beneath the receiving channels 40.

The invention claimed is:

1. A sun blind system for a motor vehicle, having two guide rails, in each of which a guide band is received, and a flat blind body which is connected to each guide band, wherein a receiving channel is provided on each guide rail for the corresponding guide band of each guide rail, said channel having two guide sections which are connected together by a deflecting section, wherein a deflecting roller is arranged in a region of the deflecting section of each receiving channel.

2. The sun blind system as claimed in claim 1, wherein the receiving channel consists of synthetic material.

3. The sun blind system as claimed in claim 1, wherein the receiving channel is formed in a region of the guide sections at least substantially with an undercut, beneath which the guide band is received.

4. The sun blind system as claimed in claim 1, wherein the deflecting roller has a radius of at least 2 cm.

5. The sun blind system as claimed in claim 1, wherein the deflecting roller has, on its side facing an opposite receiving channel, a collar with no undercut.

6. The sun blind system as claimed in claim 1, wherein an outer diameter of the deflecting roller is slightly larger than an outer diameter of regions of the deflecting section adjoining the deflecting roller axially on the outside.

7. The sun blind system as claimed in claim 1, wherein an outer cover flange is provided in a region of the deflecting section.

8. The sun blind system as claimed in claim 2, wherein the receiving channel is formed in a region of the guide sections at least substantially with an undercut, beneath which the guide band is received.

9. The sun blind system as claimed in claim 8, wherein the deflecting roller has a radius of at least 2 cm.

10. The sun blind system as claimed in claim 2, wherein the deflecting roller has, on its side facing an opposite receiving channel, a collar with no undercut.

11. The sun blind system as claimed in claim 3, wherein the deflecting roller has, on its side facing an opposite receiving channel, a collar with no undercut.

12. The sun blind system as claimed in claim 8, wherein the deflecting roller has, on its side facing an opposite receiving channel, a collar with no undercut.

13. The sun blind system as claimed in claim 9, wherein the deflecting roller has, on its side facing an opposite receiving channel, a collar with no undercut.

14. The sun blind system as claimed in claim 3, wherein an outer diameter of the deflecting roller is slightly larger than an outer diameter of regions of the deflecting section adjoining the deflecting roller axially on the outside.

15. The sun blind system as claimed in claim 13, wherein an outer diameter of the deflecting roller is slightly larger than an outer diameter of regions of the deflecting section adjoining the deflecting roller axially on the outside.

16. The sun blind system as claimed in claim 15, wherein an outer cover flange is provided in a region of the deflecting section.

* * * * *